US012792890B2

(12) United States Patent
Baker et al.

(10) Patent No.: US 12,792,890 B2
(45) Date of Patent: Nov. 10, 2026

(54) BNN TRAINING WITH MINI-BATCH PARTICLE FLOW

(71) Applicant: Raytheon Company, Arlington, VA (US)

(72) Inventors: Suzanne M. Baker, Lincoln, MA (US); Andrew C. Allerdt, Tiverton, RI (US); Michael R. Salpukas, Lexington, MA (US)

(73) Assignee: Raytheon Company, Arlington, VA (US)

( * ) Notice: Subject to any disclaimer, the term of this patent is extended or adjusted under 35 U.S.C. 154(b) by 1299 days.

(21) Appl. No.: 17/509,278

(22) Filed: Oct. 25, 2021

(65) Prior Publication Data

US 2023/0127832 A1 Apr. 27, 2023

(51) Int. Cl.
*G06N 3/047* (2023.01)
*G06N 3/0985* (2023.01)
*G06F 17/16* (2006.01)

(52) U.S. Cl.
CPC ........... *G06N 3/047* (2023.01); *G06N 3/0985* (2023.01); *G06F 17/16* (2013.01)

(58) Field of Classification Search
CPC ....... G06N 3/047; G06N 3/0985; G06F 17/16
See application file for complete search history.

(56) References Cited

U.S. PATENT DOCUMENTS 5,649,064 A 7/1997 Jorgensen et al.
10,074,041 B2 9/2018 Zhou et al.
10,386,541 B2 8/2019 Hamann et al.
10,469,087 B1 11/2019 Granade et al.
10,546,243 B1 1/2020 Irizarry
10,565,522 B2 2/2020 Piche et al.
(Continued)

FOREIGN PATENT DOCUMENTS

CN 104408518 3/2015
CN 113191064 7/2021
(Continued)

OTHER PUBLICATIONS

Dai et al. "A New Parameterized Family of Stochastic Particle Flow Filters" Sep. 27, 2021, arXiv:2103.09676 (Year: 2021).*
(Continued)

*Primary Examiner* — James D. Rutten
(74) *Attorney, Agent, or Firm* — Schwegman Lundberg & Woessner, P.A.

(57) ABSTRACT

Discussed herein are devices, systems, and methods for Bayesian neural network (BNN) training using mini-batch particle flow. A method for training a Bayesian neural network (BNN) using batched inputs and operating the trained BNN can include initializing particles such that each particle individually represents pointwise values of respective NN parameters of NNs and such that the particles collectively represent a distribution of parameters of the BNN, optimizing, using min-batch training particle flow, the particles based on batches of inputs, resulting in optimized distributions for the parameters, determining a prediction distribution using the optimized distributions for the parameters and predictions from each of the NNs, and providing a marginalized distribution representative of the prediction distribution.

8 Claims, 8 Drawing Sheets

(56) References Cited

U.S. PATENT DOCUMENTS

| | | | | |
|---|---|---|---|---|
| 10,949,747 | B1 | 3/2021 | Jahani et al. | |
| 10,990,878 | B2 | 4/2021 | Olabiyi et al. | |
| 2009/0006053 | A1 | 1/2009 | Carazzone et al. | |
| 2018/0150728 | A1* | 5/2018 | Vahdat | G06N 3/045 |
| 2018/0247200 | A1 | 8/2018 | Rolfe | |
| 2018/0373987 | A1* | 12/2018 | Zhang | G06N 7/00 |
| 2019/0188566 | A1* | 6/2019 | Schuster | G06N 20/00 |
| 2020/0050723 | A1* | 2/2020 | Matei | G06F 30/367 |
| 2021/0049472 | A1 | 2/2021 | Ishiguro et al. | |
| 2021/0089884 | A1 | 3/2021 | Macready et al. | |
| 2021/0124999 | A1 | 4/2021 | Dia | |
| 2021/0216902 | A1* | 7/2021 | Sutcher-Shepard | G06N 20/00 |
| 2021/0350231 | A1* | 11/2021 | Look | G06N 3/0499 |
| 2022/0075914 | A1 | 3/2022 | Macklin et al. | |
| 2023/0077454 | A1* | 3/2023 | Lovell | G06V 10/955 706/15 |
| 2023/0129784 | A1 | 4/2023 | Baker et al. | |

FOREIGN PATENT DOCUMENTS

| | | |
|---|---|---|
| JP | 7718762 | 7/2025 |
| WO | 2020237077 | 11/2020 |
| WO | 2021043670 | 3/2021 |
| WO | 2023076269 | 5/2023 |
| WO | 2023076273 | 5/2023 |

OTHER PUBLICATIONS

Botev, A., Ritter, H. & Barber, D.. (2017). Practical Gauss-Newton Optimisation for Deep Learning. Proceedings of the 34th International Conference on Machine Learning, in Proceedings of Machine Learning Research, 70:557-565 Available from https://proceedings.mlr.press/v70/botev17a.html (Year: 2017).*

C. Kreucher and K. Bell, "A geodesic flow particle filter for non-thresholded measurements," 2017 IEEE Radar Conference (RadarConf), Seattle, WA, USA, 2017, pp. 0891-0896, doi: 10.1109/RADAR.2017.7944329. (Year: 2017).*

Chen, Xinshi, et al., "Particle flow Bayes' rule", Proceedings of the 36 th International Conference on Machine Learning, (2019), 10 pgs.

Cobb, Adam, et al., "Introducing an explicit symplectic integration Scheme for Riemannian Manifold Hamiltonian Monte Carlo", arXiv:1910.06243v1, (2019), 15 pgs.

Cobb, Adam, et al., "Scaling Hamiltonian Monte Carlo Inference for Bayesian Neural Networks with Symmetric Splitting", arXiv.:2010.06772v1, (2020), 11 pgs.

Crouse, David, et al., "Consideration of Particle Flow Filter Implementations and Biases", Naval Research Laboratory, (2020), 17 pgs.

Hernandez-Lobato, Jose, et al., "Probabilistic backpropagation for scalable learning of bayesian neural networks", Proceeding of the 32nd International Conference on Machine Learning, (2015), 9 pgs.

Wu, Anqi, et al., "Deterministic variational inference for robust bayesian neural networks", arXiv:1810.03958v2, (2018), 24 pgs.

"International Application Serial No. PCT US2022 047728, International Search Report mailed Jan. 31, 2023", 3 pgs.

"International Application Serial No. PCT US2022 047728, Written Opinion mailed Jan. 31, 2023", 10 pgs.

"International Application Serial No. PCT US2022 047732, International Search Report mailed Mar. 1, 2023", 4 pgs.

"International Application Serial No. PCT US2022 047732, Written Opinion mailed Mar. 1, 2023", 6 pgs.

D'Angelo, F., "On Stein variational neural network ensembles", Cornell University Library, 201 Olin Library Cornell University Ithaca, Ny 14853, (Jun. 22, 2021).

Daum, Fred, "Extremely deep Bayesian learning with Gromov's method", vol. 11018, (May 7, 2019), 110180l-110180l.

Detommaso, G., "A Stein variational Newton method", Cornell University Library, 201 Olin Library Cornell University Ithaca, Ny 14853, (Oct. 29, 2023).

Di Langosco, L. Langosco, "Neural variational gradient descent", Cornell University Library, 201 Olin Library Cornell University Ithaca, Ny 14853, (Feb. 22, 2023).

Laurent, Valentin Jospin, "Hands-on Bayesian Neural Networks—a Tutorial for Deep learning Users", (Jul. 14, 2020).

Suzuki, A. Nitanda T, "Stochastic particle gradient descent for infinite ensembles", Cornell University Library, 201 Olin Library Cornell University Ithaca, Ny 14853, (Dec. 14, 2017).

Tom, Charnock, "Bayesian Neural Networks", (Nov. 6, 2020).

Wang, D., "Stein variational gradient descent with matrix-valued kernels", Cornell University Library, 201 Olin Library Cornell University Ithaca, Ny 14853, (Nov. 5, 2019).

Xinshi, Chen, "Particle Flow Bayes' Rule", (Feb. 2, 2019).

"International Application Serial No. PCT US2022 047728, International Preliminary Report on Patentability mailed May 10, 2024", 12 pgs.

"International Application Serial No. PCT US2022 047732, International Preliminary Report on Patentability mailed May 10, 2024", 8 pgs.

"European Application Serial No. 22812938.3, Response filed Nov. 11, 2024 to Communication pursuant to Rules 1611 and 162 EPC mailed Jun. 5, 2024", 62 pgs.

"European Application Serial No. 22818514.6, Response filed Nov. 11, 2024 to Communication pursuant to Rules 1611 and 162 EPC mailed Jun. 5, 2024", 59 pgs.

"Australian Application Serial No. 2022379488, First Examination Report mailed Feb. 20, 2025", 5 pgs.

"Australian Application Serial No. 2022379488, Response filed Mar. 6, 2025 to First Examination Report mailed Feb. 20, 2025", 19 pgs.

"Canadian Application Serial No. 3,233,666, Examiners Rule 862 Report mailed Mar. 18, 2025", 4 pgs.

"Canadian Application Serial No. 3,233,284, Examiners Rule 862 Report mailed Mar. 24, 2025", 4 pgs.

"Japanese Application Serial No. 2024-523578, Notification of Reasons for Refusal mailed Apr. 1, 2025", With English Machine Translation, 7 pgs.

"Japanese Application Serial No. 2024-524586, Notification of Reasons for Refusal mailed Apr. 1, 2025", With English Machine Translation, 8 pgs.

"Japanese Application Serial No. 2024-523578, Response filed Jun. 16, 2025 to Notification of Reasons for Refusal mailed Apr. 1, 2025", W English Claims, 9 pgs.

"Japanese Application Serial No. 2024-524586, Response filed Jun. 16, 2025 to Notification of Reasons for Refusal mailed Apr. 1, 2025", W English Claims, 8 pgs.

"Canadian Application Serial No. 3,233,666, Response filed Jun. 20, 2025 to Examiners Rule 862 Report mailed Mar. 18, 2025", 13 pgs.

"Australian Application Serial No. 2022376150, First Examination Report mailed Jun. 26, 2025", 3 pgs.

"Japanese Application Serial No. 2024-524586, Notification of Reasons for Refusal mailed Jul. 1, 2025", With English Machine Translation, 6 pgs.

"Canadian Application Serial No. 3,233,284, Response filed Jul. 11, 2025 to Examiners Rule 862 Report mailed Mar. 24, 2025", 12 pgs.

"U.S. Appl. No. 17/509,270, Non Final Office Action mailed Jul. 29, 2025", 28 pgs.

"Australian Application Serial No. 2022376150, Response filed Jul. 27, 2025 to First Examination Report mailed Jun. 26, 2025", 1 pg.

"Japanese Application Serial No. 2024-524586, Response filed Sep. 29, 2025 to Notification of Reasons for Refusal mailed Jul. 1, 2025", w English Claims, 8 pgs.

"U.S. Appl. No. 17/509,270, Examiner Interview Summary mailed Oct. 17, 2025", 2 pgs.

"U.S. Appl. No. 17/509,270, Response filed Oct. 29, 2025 to Non Final Office Action mailed Jul. 29, 2025", 13 pgs.

"European Application Serial No. 22812938.3, Communication Pursuant to Article 943 EPC mailed Oct. 29, 2025", 9 pgs.

Cameron, Scott A., "A Sequential Marginal Likelihood Approximation Using Stochastic Gradients", Proceedings Journal, Dec. 2019, 9 pgs.

(56) References Cited

OTHER PUBLICATIONS

Fred, Daum, “Particle flow for nonlinear filters with log-homotopy”, Signal and Data Processing of Small Targets 2008, vol. 6969, XP093327778,, Apr. 3, 2008, 12 pgs.
Jin, Shi, “A Random Batch Ewald Method For Particle Systems With Coulomb Interactions”, SIAM Journal On Scientific Computing, Mar. 2021, 23 pgs.
Khan, Muhammad Altamash, “Improvements in the Implementation of Log-Homotopy Based Particle Flow Filters”, International Conference On Information Fusion, Jul. 2015, 8 pgs.
Khan, Muhammad Altamash, “A Log Homotopy Based Particle Flow Solution For Mixture Of Gaussian Prior Densities”, International Conference On Multisensor Fusion And Integration For Intelligent Systems, Sep. 2016, 6 pgs.
Li, Yunpeng, “Particle Filtering With Invertible Particle Flow”, Transactions On Signal Processing vol. 65 Issue 15, Jun. 2019, 15 pgs.
Pal, Soumyasundar, “RNN With Particle Flow For Probabilistic Spatio-Temporal Forecasting”, Proceedings Of Machine Learning Research vol. 139, 2021, 13 pgs.
Wang, Qiyue, “Deep Learning-Based Detection of Penetration from Weld Pool Reflection Images”, The Welding Journal, Sep. 2020, 8 pgs.
Wang, Ziyu, “Function Space Particle Optimization For Bayesian Neural Networks”, Cornell University Statistics Machine Learning, May 2019, 28 pgs.
Ye, Qing, “PSO-PSParameter Synchronization with Particle Swarm Optimization for Distributed Training of Deep Neural Networks”, International Joint Conference On Neural Networks, Sep. 2020, 8 pgs.

* cited by examiner

BNN TRAINING WITH MINI-BATCH PARTICLE FLOW

TECHNICAL FIELD

Embodiments discussed herein regard devices, systems, and methods for training a Bayesian neural network (NN) using mini-batch particle flow.

BACKGROUND

Most NNs provide point estimates without a direct uncertainty metric or confidence. Standard NNs can also have relatively poor performance on open sets. Bayesian NNs (BNNs) learn statistical distributions of weights, providing a statistical environment in which decision uncertainty and confidence can be determined. The pre-existing training techniques for BNNs include Hamiltonian Monte Carlo, variational inference (both Monte Carlo and deterministic), probabilistic back propagation, and standard particle filter. These training methods are computationally expensive and require a relatively large amount of data for training.

DETAILED DESCRIPTION

Particle flow has recently been modified to be used in a Deep Learning (DL) context. Such as particle flow technique for DL training is called "training particle flow". Training particle flow can train a Bayesian Neural Network (BNN). A BNN trained using training particle flow is sometimes called a "particle flow BNN". The particle flow BNN architecture demonstrates a high predictive accuracy with few training samples and a strong capability for measuring predictive uncertainty using variance in the predictions made by the BNN. A case study using MNIST-classes {0,1} showed that this is the case. However, the current implementation of the particle flow BNN, as described below, tends to lack robustness and can be difficult to train for more than two classes. See FIGS. 4 and 5, for example. BNNs and training particle flow are described. Then a description of mini-batch particle flow training is described. Training a BNN using mini-batch particle flow provides a more robust BNN that is easier to train for more than two classes than another, single input particle flow training technique.

Figure 1:
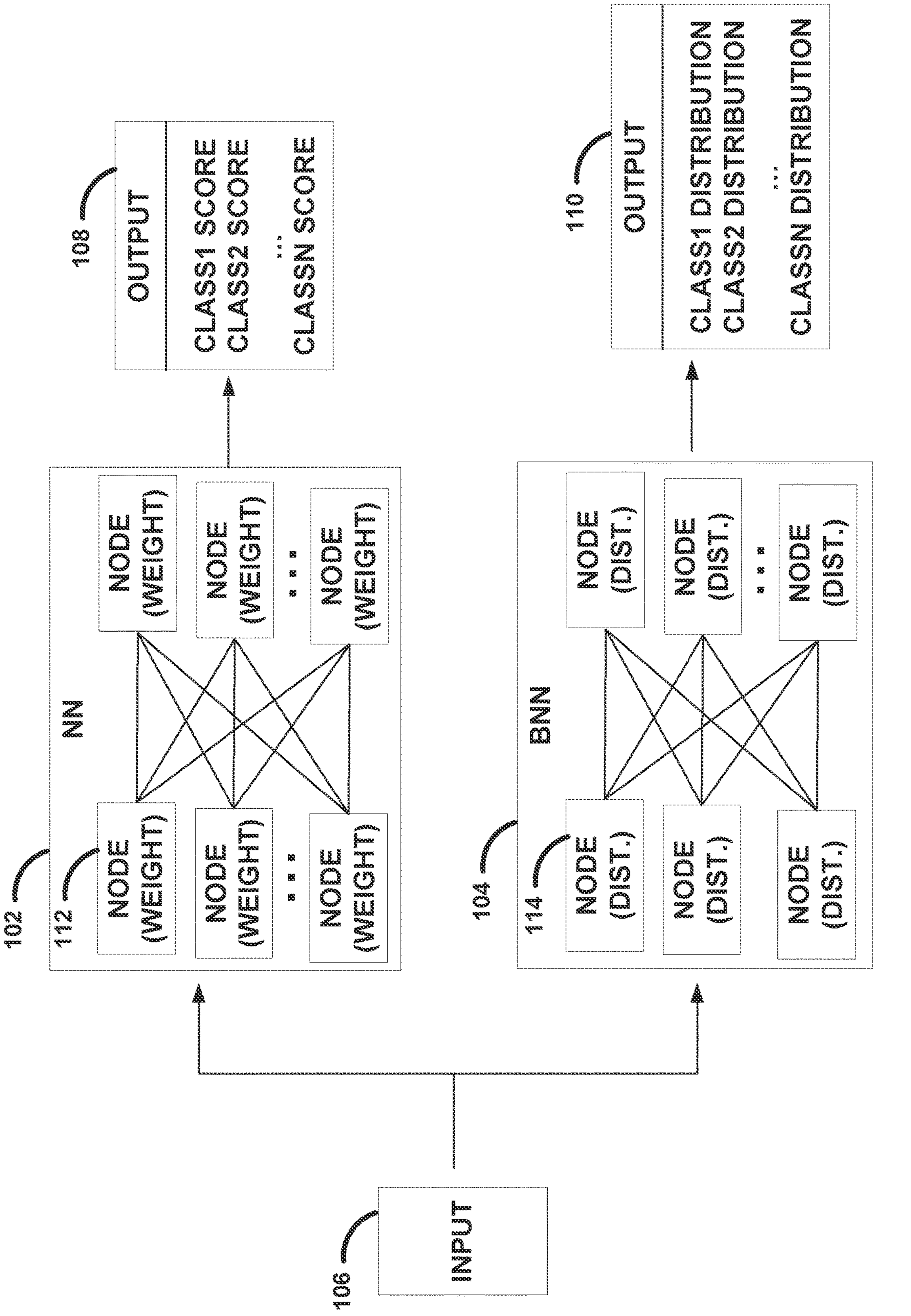
FIG. 1 illustrates, by way of example, a block diagram contrasting a standard DL architecture and a BNN.

FIG. 1 illustrates, by way of example, a block diagram contrasting a standard DL architecture 102 and a BNN 104. Standard DL architectures provide point estimates for model predictions (output 108) and network parameters (weights of nodes 112). Such DL architectures 102 do not provide a direct route towards quantifying uncertainty. Instead, standard DL architectures 102 rely on indirect methods for estimating uncertainty. Common methods include using entropy and confidence scores and functions, as well as application specific methods. Bayesian DL architectures 104 and statistical methods tend to offer a more natural landscape for quantifying uncertainty.

BNNs has been researched at least since 1992 and continues to be a growing field. BNN techniques use Bayes' theorem as a guide to solve for a posterior probability distribution of weights (distribution of nodes 114) in an NN. The computational intractability of solving Bayes' Theorem for DL tasks has led to development of numerous approaches for estimating the posterior distribution of weights in the NN. Well known approaches for BNN optimization include Hamiltonian Monte Carlo, Monte Carlo Variational Inference, Deterministic Variational Inference, and Probabilistic Back Propagation (PBP).

An output 110 of the BNN 104 is a distribution, per class as compared to the output of the NN 102 which provides a score per class as the output 108. The distribution of the output 110 can be a natural consequence of using a distribution ("dist."), instead of scalar weights as in the nodes 112, to represent the activation function of the node 114.

Deep ensembles and stochastic regularization techniques provide an alternate approach towards estimating uncertainty in DL. While these techniques do not optimize Bayes' Theorem, they do provide a statistical landscape to compute predictive uncertainty, in a fraction of the computational cost as BNNs. These statistical methods have been used in a variety of applications for uncertainty quantification.

A common theme among the existing Bayesian NNs and statistical approaches is extremely large training sets and training over thousands of epochs. However, real world datasets are commonly sparse and may not be sufficient to train a typical NN with thousands of parameters. Embodiments provide an NN architecture that can quantify uncertainty and can also perform robustly in the limit of sparse datasets and on open-set problems Embodiments use a modified form of a particle flow technique that is commonly used in particle filters but altered and repurposed to train a BNN. The modified form of the particle flow method is called "training particle flow" herein. Particle flow is a method for optimizing Bayes' Theorem that has been used exclusively (up until now), in the particle filtering context. Numerical experiments for particle flow, in the context of Particle Filtering, show that particle flow can reduce the computational complexity by many orders of magnitude relative to standard particle filters or other state-of-the-art algorithms for the same filter accuracy. Moreover, particle flow can reduce the filter errors by many orders of magnitude relative to an extended Kalman filter or other state-of-the-art algorithms for difficult nonlinear non-Gaussian problems.

While particle methods have recently emerged for optimizing NNs, using particle flow to optimize a BNN has not been done before to the best of the inventors' knowledge. Results of a BNN trained to perform a classification task with MNIST {0,1} demonstrate a high predictive accuracy with very few training samples. Further, the BNN trained to perform the classification task had a strong capability for measuring predictive uncertainty using variance in the network's predictions.

Particle Flow

Consider a system with an internal state, s, with a measurement, m. Bayes' theorem relates the posterior probability of the state given the measurement, p(s|m), to the prior distribution of the state, p(s), and the likelihood of the measurement given the state, p(m|s), according to $$p(s \mid m) = \frac{p(m \mid s)p(s)}{p(m)}. \quad \text{(Eqn. 1)}$$

Here $p(m)=\int p(m|s)p(s)ds$ is the evidence, which behaves as a normalization constant. The measurement, m, is a quantity that helps characterize what the internal state is or will be. Given a general Markov process with a set of noisy measurements, {m}, particle filters provide a method to estimate the internal state(s) {s} of the system using Bayes' Theorem as a guide.

Particle flow is a method used in a particle filtering context to estimate an optimal posterior distribution of internal states per each measurement. Particle flow optimizes Bayes' theorem by evolving the prior distribution to the posterior distribution along a log-homotopy, $$\log p(s, \lambda|m) = \lambda \log p(m|s) + \log p(s) - \log K(\lambda, m). \quad \text{(Eqn. 2)}$$

Two continuous functions in respective space are called homotopic if one continuous function can be "continuously deformed" into the other continuous function. A homotopy exists between functions that can be so deformed.

Here $K(\lambda, m)=\int p(m|s)^{\lambda}p(s)ds$ normalizes the posterior distribution $p(s, \lambda|m)$ for each λ. The scalar homotopy parameter λ=[0,1] evolves the distribution from the prior to the posterior for a given measurement, m. Each particle represents a single realization of the internal state, s, of the system. The flow of particles along the log-homotopy is described by a stochastic differential equation (SDE), $$ds = \vec{f}(s, \lambda)d\lambda + BdW \quad \text{(Eqn. 3)}$$

where $\vec{f}$ is a drift velocity, B is a diffusion matrix, and dW is a differential of a Weiner process.

The evolution of a posterior distribution of particles can be characterized by a Fokker-Planck equation (where the diffusion-squared matrix is defined as $Q_{ij}=\Sigma_k B_{ik} B_{jk}$), $$\frac{\partial p(s, \lambda \mid m)}{\partial \lambda} = -\vec{\nabla} \cdot \left(p(s, \lambda \mid m)\vec{f}\right) + \frac{1}{2}\sum_{i,j} \frac{\partial^2 (p(S, \lambda \mid m)Q_{ij})}{\partial x_i \partial x_j} \quad \text{(Eqn. 4)}$$

Here the gradients and derivatives as written in Eqn. (4) are with respect to Cartesian coordinates; however, Eqn. (4) can be used with any orthogonal coordinate system of choice by properly transforming the partial derivatives.

Various solutions for the drift velocity $\vec{f}$ and diffusion matrix Q have been found for specific choices of the prior and likelihood functional forms or whether the evolution is deterministic or stochastic. The Gromov solution for the drift velocity and diffusion matrix is, $$\vec{f} = -[\lambda(\vec{\nabla}\vec{\nabla}^T \log p(m|s)) + (\vec{\nabla}\vec{\nabla}^T \log p(s))]^{-1}\vec{\nabla} \log p(m|s) \quad \text{(Eqn. 5)}$$

$$Q = [\lambda\vec{\nabla}\vec{\nabla}^T \log p(m|s) + \vec{\nabla}\vec{\nabla}^T \log p(s)]^{-1}(-\vec{\nabla}\vec{\nabla}^T \log p(m|s))[\lambda\vec{\nabla}\vec{\nabla}^T \log p(m|s) + \vec{\nabla}\vec{\nabla}^T \log p(s)]^{-1} \quad \text{(Eqn. 6)}$$

where $\vec{\nabla}\vec{\nabla}^T$ is a Hessian matrix. The Hessian matrix is a square matrix of second-order partial derivatives of a scalar-valued function that describe local curvature of a function of variables. The Gromov solution for the diffusion matrix requires the prior and likelihood to have a Gaussian functional form and a linear relationship between the measurement and state with Gaussian white noise.

The Geodesic solution assumes the Gromov solution for the drift velocity and no diffusion (i.e., Q=0); however, it does not simultaneously satisfy Eqn. 2 and Eqn. 4. The zero-curvature solution assumes the particles do not accelerate with varying A and there is no diffusion term (i.e., Q=0). This solution has a drift velocity proportional to the Gromov drift velocity.

DL and Supervised Learning Tasks

DL is a branch of ML that uses a series of layers of nodes to learn higher order representations of data for a supervised, semi-supervised, or unsupervised learning task. While embodiments described focus on supervised learning tasks, embodiments can be applied to any learning task for which a likelihood function can be defined.

Supervised learning tasks can use a deep NN (DNN) to learn a relationship between input and output data for either regression or classification. For a regression task, the NN can predict the dependent variable $\mathcal{p}$ that is causally related to the input data; for a classification task, the network predicts the probability $\mathcal{p}_j$ of a particular class. The word "probability" is a slight misnomer here. Classification tasks often use a SoftMax activation function in an output layer to produce a vector in which its elements sum to one. While this output represents a set of class probabilities, these "probabilities" are not necessarily well calibrated to the actual accuracy of the network. In this sense, the output probabilities can be more accurately understood as a normalized score for each class. During training, the NN predictions can be evaluated against the corresponding truth class or truth values, $y_T$, of the input data, and the network weights can be adjusted using a chosen optimization scheme.

A "likelihood" function is used in many gradient-based optimization methods in DL. For regression tasks, the likelihood, $\mathcal{L}$, of truth variable, $y_T$, given NN weights $\theta=\{\theta_i\}$ and network prediction, $\mathcal{p}$, is commonly modeled by a Normal Distribution, $$\mathcal{L}(y_T|\theta, p) = \frac{1}{\sqrt{(2\pi)^k|\sum|}}\exp\left[-\frac{1}{2}(y_T - p)^T \sum^{-1}(y_T - p)\right] \quad \text{(Eqn. 7)}$$

Here Σ is a covariance matrix that scales error between the truth, $y_T$, and predictions, $\mathcal{p}$, and index, k, represents a dimensionality of $y_T$. This likelihood function assumes Gaussian white noise discrepancies between the prediction, $\mathcal{p}$, and truth, $y_T$. A corresponding log-likelihood is given by, $$\log\mathcal{L} = -\frac{1}{2}\left[k\log 2\pi + \log\left|\sum\right| + (y_T - p)^T \sum^{-1} (y_T - p)\right], \quad \text{(Eqn. 8)}$$

which is reminiscent of the Mean Squared Error (MSE) when $\Sigma$ is the identity matrix.

For classification tasks, a categorical distribution describes the likelihood, $\mathcal{L}$, of the true class, $y_T$, of an input given the predicted class probabilities, $\mathcal{p}_j$, $j\in[1, n_{class}]$ and NN weights $\theta$, $$\mathcal{L}(y_T|\theta, p) = \prod_j p_j^{y_{T,j}}, \quad \text{(Eqn. 9)}$$

where $y_T=\{y_{Tj}\}$ is a one-hot encoded vector, or a non-binary vector that sums to one if using soft labels, of the truth class of the image. The corresponding log-likelihood is the negative of cross-entropy function, $$\log\mathcal{L} = \log\left[\prod_j \mathcal{p}_j^{y_{Tj}}\right] = \sum_j y_{Tj}\log\mathcal{p}_j. \quad \text{(Eqn. 10)}$$

Mapping Particle Flow for Training BNNs

Figure 2:
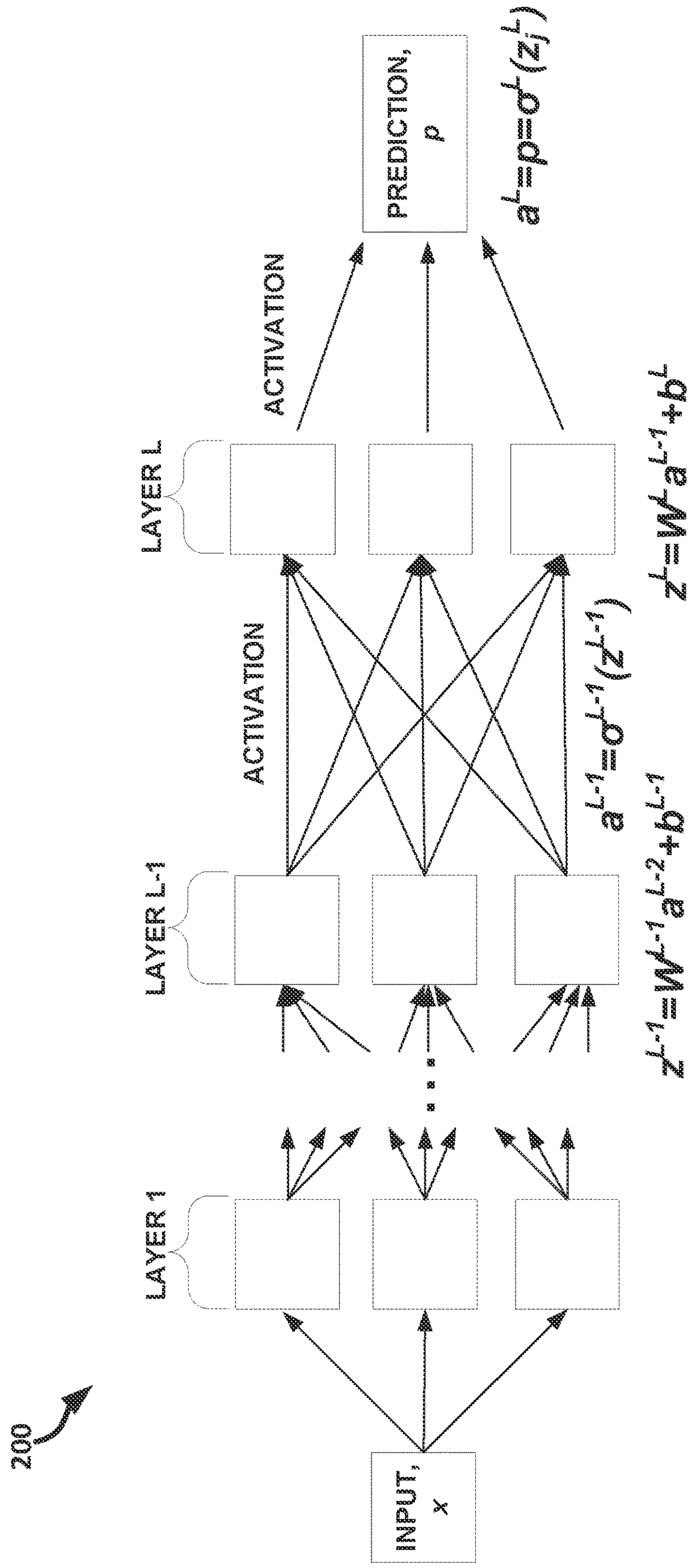
FIG. 2 illustrates, by way of example, a diagram of an embodiment of an NN.

FIG. 2 illustrates, by way of example, a diagram of an embodiment of an NN 200. The NN 200 includes L layers of nodes. The L-layer NN, $\Lambda_\theta$, has a set of network parameters $\theta=\{\theta_j\}=\{W^1, b^1, W^2, b^2, \ldots, W^L, b^L\}$, which includes all the weights and biases. The NN 200 has a total of $N_{param}$ parameters, such that the network parameter $\theta$ is a $N_{param}$-dimensional vector, $\theta\in\mathbb{R}^{N_{params}}$.

In a typical supervised learning task, a set of training data $\mathcal{D}=\{\mathcal{X}, \mathcal{Y}_T\}$ is used to train the NN 200. Here $\mathcal{X}=\{x_j\}$ is the set of all inputs and $\mathcal{Y}_T=\{y_{T,j}\}$ the corresponding set of all truth values given $\mathcal{X}$. Each NN prediction $\mathcal{p}_j$ results from a series of 2L compositions on the data, $\Lambda_\theta=(\sigma^L\circ g^L\circ\sigma^{L-1} \ldots \circ\sigma^1\circ g^1)$, $$p_j = \Lambda_\theta(x_j) \quad \text{(Eqn. 11)}$$

where $\sigma$ describes an activation function for each layer of nodes and g describes an affine transformation at each layer nodes.

The goal of BNN is to learn an optimal posterior distribution of network parameters $p(\theta|\mathcal{D})$ given the data using Bayes' Theorem, $$p(\theta|D) = p(\theta|\{X, \mathcal{Y}_T\}) = \frac{\mathcal{L}(\mathcal{Y}_T|\theta, X)p(\theta)}{p(\mathcal{Y}_T|X)}. \quad \text{(Eqn. 12)}$$

Here $p(\theta)$ describes the prior distribution on the network parameters, $\{\theta_j\}$, $\mathcal{L}(\mathcal{Y}_T|\theta, \mathcal{X})=\mathcal{L}(\mathcal{Y}_T|\Lambda_\theta(\mathcal{X}))$ describes the likelihood of the truth values $\mathcal{Y}_T$ given the NN predictions $\mathcal{P}=\Lambda_\theta(\mathcal{X})$ (see Eqns. (7) and Eqn. (9) A normalization factor in Eqn. (12) is defined as $p(\mathcal{Y}_T|\mathcal{X})=\int\mathcal{L}(\mathcal{Y}_T|\theta, \mathcal{X})p(\theta)d\theta$.

Note that the right hand side of Eqn. (12) follows from a reduction of the full expression of the posterior probability, $$p(\theta|\{X, \mathcal{Y}_T\}) = \frac{\mathcal{L}(\mathcal{Y}_T|\theta, X)_p(X|\theta)p(\theta)}{\int\mathcal{L}(\mathcal{Y}_T|\theta, X)_p(X|\theta)p(\theta)d\theta},$$

where the denominator is the evidence $p(\{\mathcal{X}, \mathcal{Y}_T\})=\int\mathcal{L}(\mathcal{Y}_T|\theta, \mathcal{X})p(\mathcal{X}|\theta)p(\theta)d\theta$. Given the conditional independence of the inputs $\mathcal{X}$ on the network parameters $\theta$, the conditional probability becomes $p(\mathcal{X}|\theta)=p(\mathcal{X})p(\theta)$. Substituting this into the full expression for the posterior probability reproduces the RHS of Eqn. (12), $$p(\theta|\{X, \mathcal{Y}_T\}) = \frac{[\mathcal{L}(\mathcal{Y}_T|X, \theta)_p(\theta)]p(X)}{\left[\int\mathcal{L}(\mathcal{Y}_T|\theta, X)_p(\theta)d\theta\right]p(X)} = \frac{\mathcal{L}(\mathcal{Y}_T|\theta, X)_p(\theta)}{\left[\int\mathcal{L}(\mathcal{Y}_T|\theta, X)_p(\theta)d\theta\right]} = \frac{\mathcal{L}(\mathcal{Y}_T|\theta, X)_p(\theta)}{p(\mathcal{Y}_T|X)}.$$

Embodiments map particle flow, used in the particle filtering context, to the DL context, resulting in training particle flow, by equating the internal states {s} and the measurements {m} in Eqn. (1) to the network parameters $\theta$ and truth values $\mathcal{Y}_T$, respectively, in Eqn. (12). Each particle, under these equalities, now represents a single realization of network parameters $\{\theta_j\}$. Training particle flow evolves the values of the network parameters $\{\theta_j\}$ in the NN with homotopy scalar $\lambda$. The likelihood of each measurement, m, given the internal state s, is replaced by a likelihood of the truth value, $\mathcal{Y}_T$, given the prediction, $\mathcal{P}$, of the network 200 based on the input data, $\mathcal{X}$. In the DL context, each particle represents a single realization of network parameters $\{\theta_j\}$.

A mapping of particle flow as used in the particle filtering context to training particle flow is mathematically described in Eqn. (13)-Eqn. (15).

$$p(s|m) = \frac{p(m|s)p(s)}{p(m)} \to p(\theta|\{X, \mathcal{Y}_T\}) = \frac{\mathcal{L}(\mathcal{Y}_T|\theta, X)p(\theta)}{p(\mathcal{Y}_T|X)} \quad \text{(Eqn. 13)}$$

$$m \to \mathcal{Y}_T \quad \text{(Eqn. 14)}$$

$$s \to \theta,\ d\theta = \vec{f}d\lambda + BdW \quad \text{(Eqn. 15)}$$

The log-homotopy constraint given in Eqn. (3) becomes, $$\log p(\theta,\lambda|\{\mathcal{X}, \mathcal{Y}_T\})=\lambda \log \mathcal{Y}(\mathcal{L}_T|\theta, \mathcal{X})+\log p(\theta)-\log p(\lambda, \mathcal{Y}_T|\mathcal{X}) \quad \text{(Eqn. 16)}$$

where the scalar homotopy parameter, $\lambda$, was added to the notation of the posterior distribution and the normalization factor to designate the variance of these terms on $\lambda$. The corresponding gradients and derivatives as written in Eqn. (4) are now with respect to the network parameters for training particle flow, $$\frac{\partial p(\theta, \lambda|\{X, \mathcal{Y}_T\})}{\partial\lambda} = -\vec{\nabla}_\theta\cdot\left(p(\theta, \lambda|\{X, \mathcal{Y}_T\})\vec{f}\right) + \frac{1}{2}\sum_{i,j}\frac{\partial^2(p(\theta, \lambda|\{X, \mathcal{Y}_T\})Q_{ij})}{\partial\theta_i\partial\theta_j} \quad \text{(Eqn. 17)}$$

Eqn. 18 shows a mathematical representation of drift velocity in training particle flow using the Gromov expression, $$\vec{f} = -\left[\lambda\left(\vec{\nabla}_\theta \vec{\nabla}_\theta^T \log\mathcal{L}\right) + \left(\vec{\nabla}_\theta \vec{\nabla}_\theta^T \log p(\theta)\right)\right]^{-1} \vec{\nabla}_\theta \log\mathcal{L}. \quad \text{(Eqn. 18)}$$

The Gromov expression generalizes well to architectures with L≥1 layers, varying activation functions, and arbitrary prior and likelihood functional forms. However, Eqn. (18) only satisfies Eqn. (16)-(17) when the NN 200 has a single layer with a linear activation function, $\Lambda_\theta(\mathcal{X})=\sigma^1 \circ g^1(\mathcal{X})=g^1(\mathcal{X})$, the prior and likelihood have a Gaussian functional form, and Q is given by Eqn. (6).

Eqn. 19 provides a mathematical representation of a constant diffusion matrix used in the particle flow training, $$Q=\alpha Id, \quad \text{(Eqn. 19)}$$

where $\alpha \in \mathbb{R}_{>0}$ is a positive real number and Id is the identity matrix. A constant diffusion matrix can help provide numerical stability. Additionally, adding a small amount of noise can prevent the network training from getting stuck in local minima. A small exponential damping factor can also be added to the diffusion matrix to reduce the impact of noise with increasing number of weight updates, $$Q=\alpha \exp[-\beta(\text{update } \#)]Id, \quad \text{(Eqn. 20)}$$

where β>0 scales the rate of damping.

NN Training Procedure Using Training Particle Flow

Figure 3:
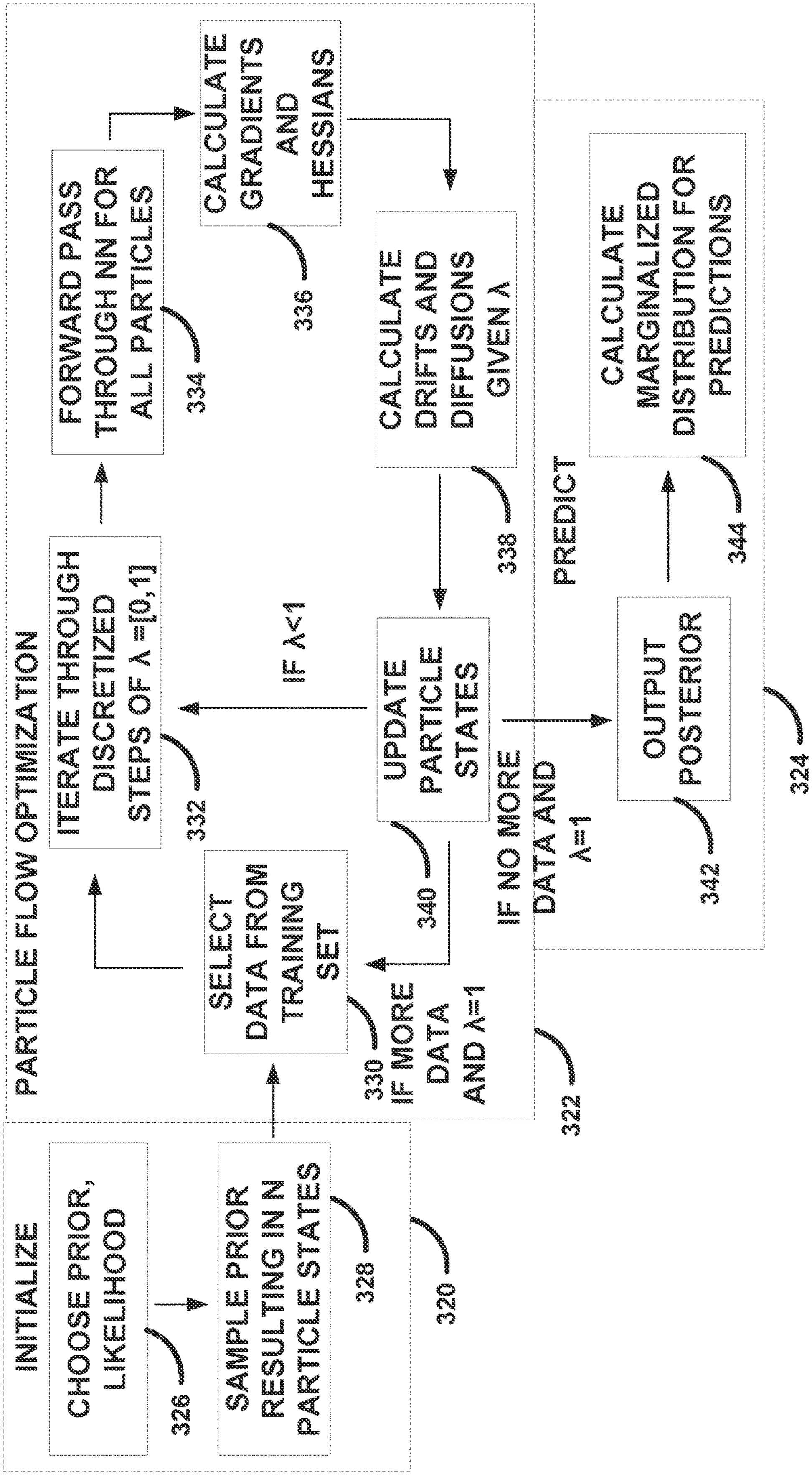
FIG. 3 illustrates, by way of example, a flow diagram of an embodiment of an NN training procedure using training particle flow.

FIG. 3 illustrates, by way of example, a flow diagram of an embodiment of an NN training procedure using training particle flow. The procedure includes initialization 320, training particle flow optimization 322, and prediction 324.

The initialization 320 includes a user choosing, or a computer automatically instantiating, a functional form of a likelihood and prior at operation 326. The initialization 320 includes sampling the chosen prior distribution p(θ) at operation 328. Sampling initializes each realization of the NN that is optimized at optimization 322. If a multivariate normal distribution is chosen as the prior at operation 326, the corresponding Hessian has a simple analytical form, $$p(\theta)\sim\mathcal{N}(\theta;\lambda,\Gamma), \quad \text{(Eqn.20)}$$

$$\vec{\nabla}_\theta \vec{\nabla}_\theta^T \log p(\theta) = \Gamma^{-1}. \quad \text{(Eqn. 21)}$$

where μ is a mean vector and Γ is a covariance matrix. The mean adds an initial offset to the values of the network parameters. The mean can be set to zero for simplicity and to avoid adding an incorrect offset. However, an offset can be known and used. The values of Γ characterize the initial spread of each network parameter and potential correlations. The values can be chosen to be large enough to encourage fast learning, yet small enough to discourage divergences in the network.

For the likelihood functions, Eqn. (7) or (9) can be used depending on the type of supervised learning task. The residual covariance in Eqn. (7) can be chosen similarly to the prior covariance (e.g., to promote learning, yet to prevent divergences). The number of particles, N, can be chosen to be large enough to provide sufficient statistics on the data and to avoid divergences in the covariance matrix.

The particle flow optimization 322 can be described as follows: For each data point in the training set $(x_j, y_{T,j})\in\mathcal{D}$ (select data from training set at operation 330):

- Equate the current distribution of particles to the prior distribution of the particles.
- Calculate the covariance of the prior distribution of particles, Γ.
- Loop iteratively through the scalar homotopy parameter λ=[0,1] (operation 332)
  - For each $\lambda_k$, k=1, 2, . . . , $N_\lambda-1$
    - Calculate integration step size, $\delta\lambda=\lambda_{k+1}-\lambda_k$
    - For each particle $\{\theta_i\}$, i=1, 2, 3 . . . , N: (operation 334)
      - Pass data input $x_j$ through network (operation 334) using particle's values to get a prediction $\mathcal{p}_j=\Lambda\theta_i(x_j)$
      - Calculate gradients and hessians of the log-likelihood with respect to network parameters (operation 336)
      - Calculate the drift f and diffusion matrix Q (operation 338)
      - Update state of particle using numerical integration of stochastic differential equation (SDE) (Eqn. 15) (operation 340)

$\theta_i=\theta_i+f\delta\lambda+\sqrt{Q\delta\lambda}n, n\sim\mathcal{N}(0,Id)$ At operation 330, a pair of input and output values is selected from the data set. At operation 332, the operation 322 iterates through discretized steps of the homotopy parameter λ. At operation 334, a particle state of the N particle states from operation 328 is selected and data can be passed through the selected NN. A result of operation 334 can be a prediction. At operation 336 the gradients (derivatives) and Hessians are calculated. Drifts and diffusions are determined based on the gradients and Hessians at operation 338. At operation 340, particle states are updated.

Particle flow uses numerical integration to integrate Eqn. (15). An interpolation of the scalar homotopy parameter $\lambda=\{\lambda_k: k\in[1, N_\lambda]\}$, at operation 332) for the numerical integration can be based on a linear, log, or adaptive scale. The number of divisions $N_\lambda$ of the scalar homotopy parameter can be balanced by integration accuracy and algorithm efficiency. While there are several different methods of numerical integration for SDE, Euler-Maruyama method can be used for computation efficiency.

In prediction 324, an output prediction can be provided at operation 342. A marginalized probability distribution of the output prediction given a new input is determined at operation 344. The unmarginalized predictive distribution for an output prediction $\mathcal{p}'$ given a new input x', the training data $\mathcal{D}$, and the particles θ is, $$p(\mathcal{p}'|x',\mathcal{D},\theta)=\Lambda_\theta(x')p(\theta|\mathcal{D}) \quad \text{(Eqn. 21)}$$

Marginalizing Eqn. (21) over all network realizations θ gives the predictive distribution of an output prediction $\mathcal{p}'$ given a new input x' and the training data $\mathcal{D}$, $$p(\mathcal{p}'|x',\mathcal{D})=\int p(\mathcal{p}'|x',\mathcal{D},\theta)d\theta \quad \text{(Eqn. 22)}$$

Embodiments can evaluate Eqn. (22) using a Monte Carlo sampling of the posterior distribution $p(\theta|\mathcal{D})$, where the sampling is over all particles $\{\theta_i\}$, $$p(p'|x', D) \approx \frac{1}{N}\sum_{i=1}^{N} p(p'|x', D, \theta_i) = \frac{1}{N}\sum_{i=1}^{N} \Lambda_{\theta_i}(x') \quad \text{(Eqn. 23)}$$

As is seen, the predictive distribution is a marginalization of the posterior with the network prediction, which is a sum over network parameters.

Mini-Batch Particle Flow

One issue with training particle flow is that it tends to be sensitive to each measurement (particle update). A data input outlier can drive the particle distribution in the wrong direction during a measurement update, leading to a large jump in the predictive accuracy. In some cases, the BNN being trained does not recover from such a detour. Another issue with training particle flow is that training a particle flow BNN takes longer than training a standard NN (non-Bayesian NN), which can process "mini-batches" of data for each weight update. In contrast, the particle flow optimization procedure is formulated to only process one data point at a time, which prevents any sort of batch processing. This is because particle filters typically provide a state-transition update at a specific time followed by a measurement update conditioned on this specific time. The coupling between the state-transition and measurement in time necessitates processing measurements one at a time. Thus, there is no reason for particle flow, used exclusively in the context of particle filters up until recently, to process more than one measurement at a time.

Figure 4:
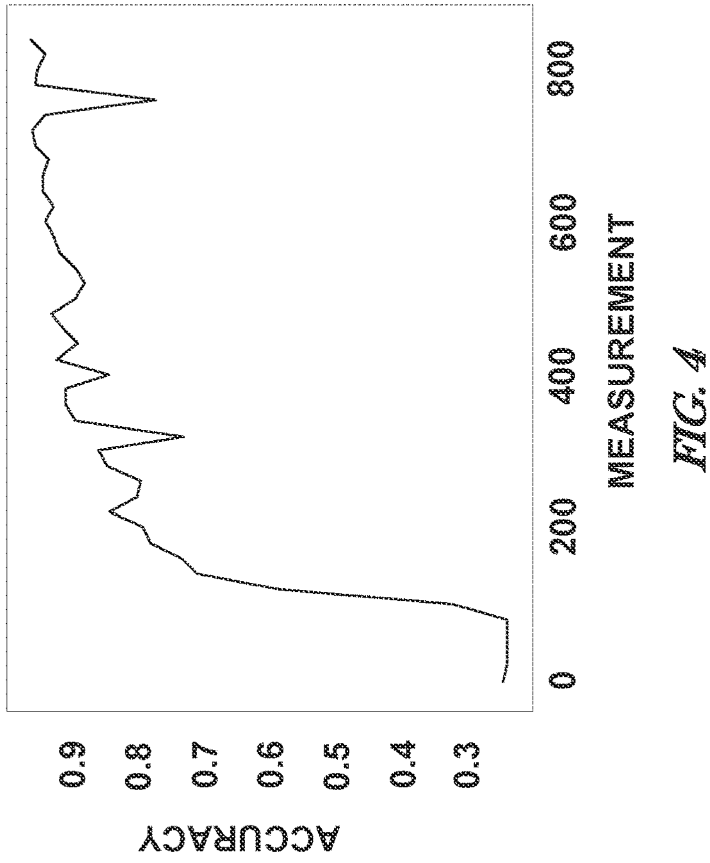
FIG. 4 illustrates, by way of example, a plot of accuracy versus measurement update for a BNN being trained based on MNIST {0, 1} using training particle flow.

FIG. 4 illustrates, by way of example, a plot of accuracy versus measurement update for a BNN being trained based on MNIST {0, 1} for training particle flow BNN described regarding FIGS. 1-3. In this example, the accuracy of the BNN experiences reductions in the accuracy. The BNN does recover from these reductions in the example of FIG. 4.

Figure 5:
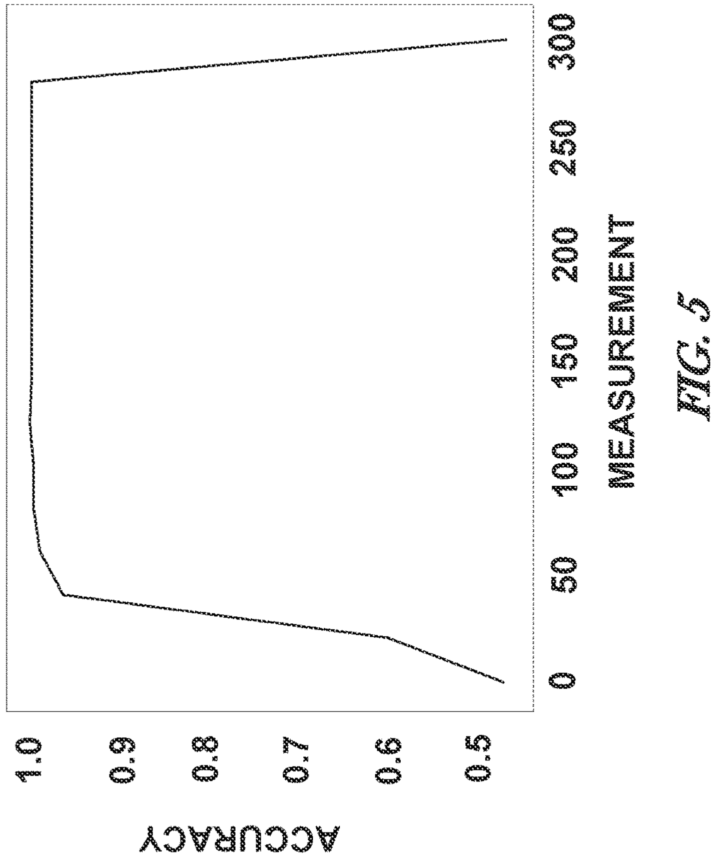
FIG. 5 illustrates, by way of example, a plot of accuracy versus measurement update for a BNN being trained on MNIST {0, 1, 2, 3}.

FIG. 5 illustrates, by way of example, a plot of accuracy versus measurement update for a BNN being trained on MNIST {0, 1, 2, 3}. In the example of FIG. 5, the accuracy of the BNN experiences a large reduction in accuracy between measurements 280 and 300. The BNN in the example of FIG. 5 does not recover from this reduction, and the network parameters maintain values that produce predictions with low accuracy.

A mini-batch training particle flow BNN is now described. This mini-batch particle flow BNN training formulation retains a core training particle flow optimization procedure, but modifies the training particle flow framework to accommodate mini-batch processing of data. The use of mini-batches in stochastic gradient descent type training is a well-established practice for training NNs. However, the use of mini-batches in a training particle flow BNN, or even particle flow itself, has not been done before to the best of the inventors' knowledge. Results on MNIST {0,1} using mini-batch particle flow demonstrate that being able to process more data for a single update greatly increases the training speed and accuracy of the resulting model. Using mini-batches in training particle flow helps avoid the reductions in accuracy experienced when using particle updates that are performed based on singular inputs. However, modifications to training particle flow are required to be able to use mini-batches in training particle flow. These modifications, when implemented, reduce training time of a BNN and increase accuracy of a trained BNN.

Consider a mini-batch of data d={x, $\mathcal{y}_T$}, d∈ $\mathcal{D}$ with $N_{mb}$ number of samples. The joint posterior probability over all $N_{mb}$ independently distributed data samples in the mini-batch is, $$P_{joint} = \prod_{i=1}^{N_{mb}} p(\theta, \lambda | \{x_i, y_{T,i}\}) = \prod_{i=1}^{N_{mb}} \frac{\mathcal{L}(y_{T,i}|\theta, x_i)^{\lambda} p(\theta)}{p(\lambda, _{y,T,i} | x_i)} \quad \text{(Eqn. 24)}$$

where p(θ, λ|{$x_i$, $\mathcal{y}_{T,i}$}) is the posterior distribution for the i-th sample in the minibatch and λ is the scalar homotopy. Here the same prior distribution p(θ) of particles is assumed for each of the samples in the mini-batch. Taking the logarithm of the joint posterior probability gives, $$\log P_{joint} = \sum_{i=1}^{N_{mb}} \log p(\theta, \lambda | \{x_i, y_{T,i}\}) = \left[\lambda \sum_{i=1}^{N_{mb}} \log \mathcal{L}(y_{T,i}|\theta, x_i)\right] + N_{mb} \log P(\theta) - \left[\sum_{i=1}^{N_{mb}} \log p(\lambda, y_{T,i}|x_i)\right] \quad \text{(Eqn. 25)}$$

Eqn. 25 can be re-written as:

$$\log P_{joint} = \lambda \log \mathcal{L}_{MB} + \log p_{MB}(\theta) - \log K \quad \text{(Eqn. 26)}$$

where the mini-batch log likelihood is log $\mathcal{L}_{MB}$=

$$\log\left[\prod_{i=1}^{N_{mb}} \mathcal{L}(\mathcal{y}_{T,i}|\theta, x_i)\right] = \left[\sum_{i=1}^{N_{mb}} \log \mathcal{L}(\mathcal{y}_{T,i}|\theta, x_i)\right],$$

the mini-batch log prior is log $p_{MB}(\theta) = N_{mb}$ log p(θ), and the mini-batch log normalization constant, which has a zero gradient or Hessian with respect to the network parameters, is log $$K = \sum_{i=1}^{N_{mb}} \log p(\lambda, \mathcal{y}_{T,i}|x_i).$$

By comparing Eqn. 26 to Eqn. 16, one can deduce the drift vector for the entire mini-batch update to be, $$\vec{f}_{MB} = -\left[\lambda\left(\vec{\nabla}_\theta \vec{\nabla}_\theta^T \log \mathcal{L}_{MB}\right) + \left(\vec{\nabla}_\theta \vec{\nabla}_\theta^T \log p_{MB}(\theta)\right)\right]^{-1} \vec{\nabla}_\theta \log \mathcal{L}_{MB}.$$

One can derive this expression by using the general approach laid out in Appendix A of Ref. D. F. Crouse and C. Lewis, "Consideration of Particle Flow Filter Implementations and Biases," *Naval Research Lab*, Washington, D.C. (2019) for the single measurement case.

It is important to point out that the drift vector for the mini-batch (Eqn. 27) does not equal the sum of drift vectors (Eqn. 18) over all samples in the mini-batch, $$\vec{f}_{MB} \neq \sum_{i=1}^{N_{mb}} \vec{f}_i. \quad \text{(Eqn. 28)}$$

The gradient operator $\vec{\nabla}_\theta$ is a linear operation. Consequently, the gradient of the mini-batch log-likelihood $\vec{\nabla}_\theta$ log $\mathcal{L}_{MB}$ is equal to the sum of the gradients for each sample in the minibatch, $$\left(\text{e.g. } \vec{\nabla}_\theta \log \mathcal{L}_{MB} = \sum_{i=1}^{N_{mb}} \vec{\nabla}_\theta \log \mathcal{L}(\mathcal{Y}_{T,i}|\theta, x_i)\right).$$

However, the multiplication of the mini-batch log-likelihood with the inverse of the sum of Hessians, $$\left[\lambda\left(\vec{\nabla}_\theta \vec{\nabla}_0^T \log \mathcal{L}_{MB}\right) + \left(\vec{\nabla}_\theta \vec{\nabla}_\theta^T \log p_{MB}(\theta)\right)\right]^{-1},$$

breaks the equivalence of Eqn. (27) to the sum of the drift vectors in Eqn. (18). This equivalence is further broken by the non-additivity of the matrix inversion in Eqn. (27). In other words, the sum of the inverse of matrices is not equal to the inverse of the sum of matrices. That is $A^{-1}+B^{-1}+C^{-1}+\ldots \neq (A+B+C+\ldots)^{-1}$.

NN Training Procedure Using Mini-batch Training Particle Flow

Figure 6:
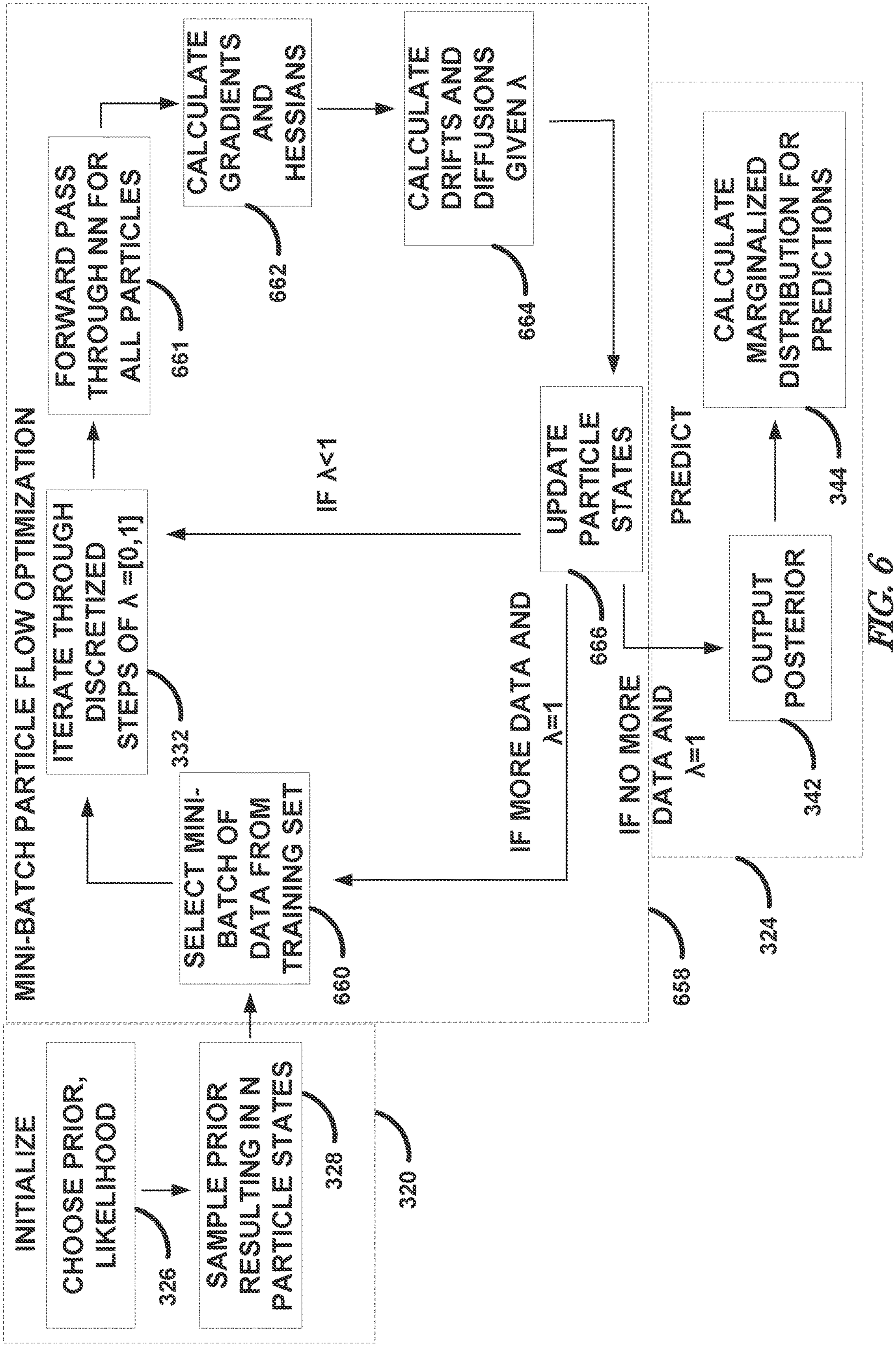
FIG. 6 illustrates, by way of example, a flow diagram of an embodiment of a mini-batch training particle flow technique.

FIG. 6 illustrates, by way of example, a flow diagram of an embodiment of a mini-batch training particle flow technique. The technique is similar to the training particle flow technique illustrated in FIG. 3 with small alterations in the particle flow optimization 322 resulting in a mini-batch particle flow optimization 658. The particle flow optimization 658 includes selecting a mini-batch of data from the training set at operation 330, iterating through the discretized steps of the homotopy at operation 332, and, at operation 334, determining a batch of predictions.

Various Python ML and AI libraries, such as Pytorch® or TensorFlow®, do not store the individual gradients for each sample in the mini-batch; instead they either sum or average the gradients by default to increase efficiency and reduce memory usage.

To accommodate these libraries, the mini-batch particle flow training optimization 658 can be adjusted to evolve the average of the log of the joint posterior probability, $$\log P'_{joint} = \frac{1}{N_{mb}} \log P_{joint} \sim \left[ \frac{\lambda}{N_{mb}} \sum_{i=1}^{N_{mb}} \log \mathcal{L}(y_{T,i} \mid \theta, x_i) \right] + \log p(\theta) - \frac{1}{N_{mb}} \log K \quad \text{(Eqn. 29)}$$

where p(θ) is the prior distribution of the particles prior to a batch update since $\log p_{MB}(\theta) = N_{mb} \log p(\theta)$. This physically corresponds to the taking the geometric mean of the posterior probabilities for each sample within the mini-batch, $$\log P'_{joint} = \log[P_{joint}]^{1/N_{mb}} \rightarrow P'_{joint} = \sqrt[N_{mb}]{\prod_{i=1}^{N_{mb}} p(\theta, \lambda \mid \{x_i, y_{T,i}\})}. \quad \text{(Eqn. 30)}$$

The drift vector, determined at operation 664, then becomes, $$\vec{f}_{MB} = -\left[ \frac{\lambda}{N_{mb}} \left( \vec{\nabla}_\theta \vec{\nabla}_\theta^T \log \mathcal{L}_{MB} \right) + \left( \vec{\nabla}_\theta \vec{\nabla}_\theta^T \log p(\theta) \right) \right]^{-1} \left( \frac{1}{N_{MB}} \right) \vec{\nabla}_\theta \log \mathcal{L}_{MB}. \quad \text{(Eqn. 31)}$$

The mean of the gradient of log $\mathcal{L}_{MB}$ can be computed in most ML libraries by setting log $\mathcal{L}_{MB}$ as the objective function. However, calculating the mean of the Hessian of the mini-batch log-likelihood deserves careful thought to ensure averaging is performed at the correct time.

Training particle flow can use a Gauss-Newton Hessian approximation to calculate the Hessian of the log-likelihood, $$\left( \vec{\nabla}_\theta \vec{\nabla}_\theta^T \log \mathcal{L} \right)_{rs} \approx \sum_m \sum_k \frac{\partial p_k^T}{\partial \theta_r} \frac{\partial^2 \log \mathcal{L}}{\partial p_k \partial pm} \frac{\partial pm}{\partial \theta_s}, \quad \text{(Eqn. 32)}$$

where $p_m$ is the m-th component of the network prediction and the r, s describe the indices of the Hessian. Averaging the Hessian of the mini-batch log-likelihood includes averaging the Hessian for each sample in the mini-batch, $$\frac{1}{N_{mb}} \left( \vec{\nabla}_\theta \vec{\nabla}_\theta^T \log \mathcal{L}_{MB} \right)_{rs} = \frac{1}{N_{mb}} \left[ \sum_{i=1}^{N_{MB}} \vec{\nabla}_\theta \vec{\nabla}_\theta^T \log \mathcal{L}(y_{T,i} \mid \theta, x_i) \right]_{rs} \approx \frac{1}{N_{mb}} \sum_{i=1}^{N_{MB}} \sum_m \sum_k \frac{\partial p_k^T}{\partial \theta_r} \frac{\partial^2 \log \mathcal{L}(y_{T,i} \mid \theta, x_i)}{\partial p_k \partial p_m} \frac{\partial p_m}{\partial \theta_s}. \quad \text{(Eqn. 33)}$$

This means that both the Jacobian terms, $$\frac{\partial p_m}{\partial \theta_s},$$

and the Hessian terms, $$\frac{\partial^2 \log \mathcal{L}(y_{T,i} \mid \theta, x_i)}{\partial p_k \partial p_m},$$

are calculated and stored for each sample in the minibatch at operation 662; then the product of these terms, as described in Eqn. (33), is averaged and used in the particle state update at operation 666.

The mini-batch particle flow optimization 658 can be summarized as follows:

For each mini-batch of data in the training set $d=\{x, \mathcal{Y}_T\}$, $d \in \mathcal{D}$ (select mini-batch of data from training set at operation 660):

- Equate the current distribution of particles to the prior distribution of the particles.
- Calculate the covariance of the prior distribution of particles, Γ.
- Loop iteratively through the scalar homotopy parameter λ=[0,1] (operation 332)
  - For each $\lambda_k$, k=1, 2, . . . , $N_\lambda - 1$
    - Calculate integration step size, $\delta\lambda = \lambda_{k+1} - \lambda_k$
    - For each particle $\{\theta_i\}$, i=1, 2, 3 . . . , N: (operation 334)
      - Pass mini-batch of input data $x=\{x_j\}$ through network (operation 661) using particle's values to get a batch of predictions $$\{\mathcal{P}_j\} = \Lambda_{\theta_i}(\{x_j\}))$$

- Calculate mean gradients and hessians of mini-batch log-likelihood with respect to network parameters (operation 662)
- Calculate the drift f and diffusion matrix Q (operation 664)
- Update state of particle using numerical integration of stochastic differential equation (SDE) (Eqn. 15) (operation 666)

$$\theta_i = \theta_i + f\delta\lambda + \sqrt{Q\delta\lambda}\, n, n \sim \mathcal{N}(0, Id)$$

Results for classification of a subset of digits {0, 1} from the Modified National Institute of Standards and Technology (MNIST) database. The MNIST database was created by Yann LeCun, Corinna Cortes, and Christopher J.C. Burges using images from two separate NIST databases. The MNIST database can be accessed at http://yann.lecun.com/exdb/nnist/.

A convolutional NN (CNN) architecture consisting of 2 convolutional layers, each with 4 filters, followed by a dense output layer was instantiated. This network has 286 network parameters. 100 normally distributed particles with an initial covariance of $\Gamma$=0.04Id were also instantiated. Numerical integration of the flow was performed using a logarithmic step size with $N_\lambda$=10.

TABLE 1

List of Parameters used in Results

| | |
|---|---|
| Initial Prior Covariance | $\Gamma$ = 0.04 Id, Id = Identity |
| Diffusion Matrix constant | $\alpha$ = 0.1 |
| Interpolation Scheme and # Divisions | Logarithmic Scheme with $N_\lambda$ = 10 |
| Number of Particles | N = 100 |
| Number of Network Layers | L = 3; 2 Convolutional, 1 Output |
| Number of Network Parameters | $N_{params}$ = 286 |

Mini-batch training particle flow was implemented to train a BNN with batch updates of $N_{MB}$=1, $N_{MB}$=2, and $N_{MB}$=16. For mini-batch sizes >1, batches contain an equal distribution of classes (e.g., batch-size of 16 contains 8 of class 0 and 8 of class 1). From these training examples, the smoothness of the mean log-likelihood increases with mini-batch size. Additionally, the divergence of the each particle's log-likelihoods from the mean decrease with increasing batch-size. This implies that individual particles are less susceptible to outliers than when no mini-batches (batch-size of 1) are used.

Figure 7:
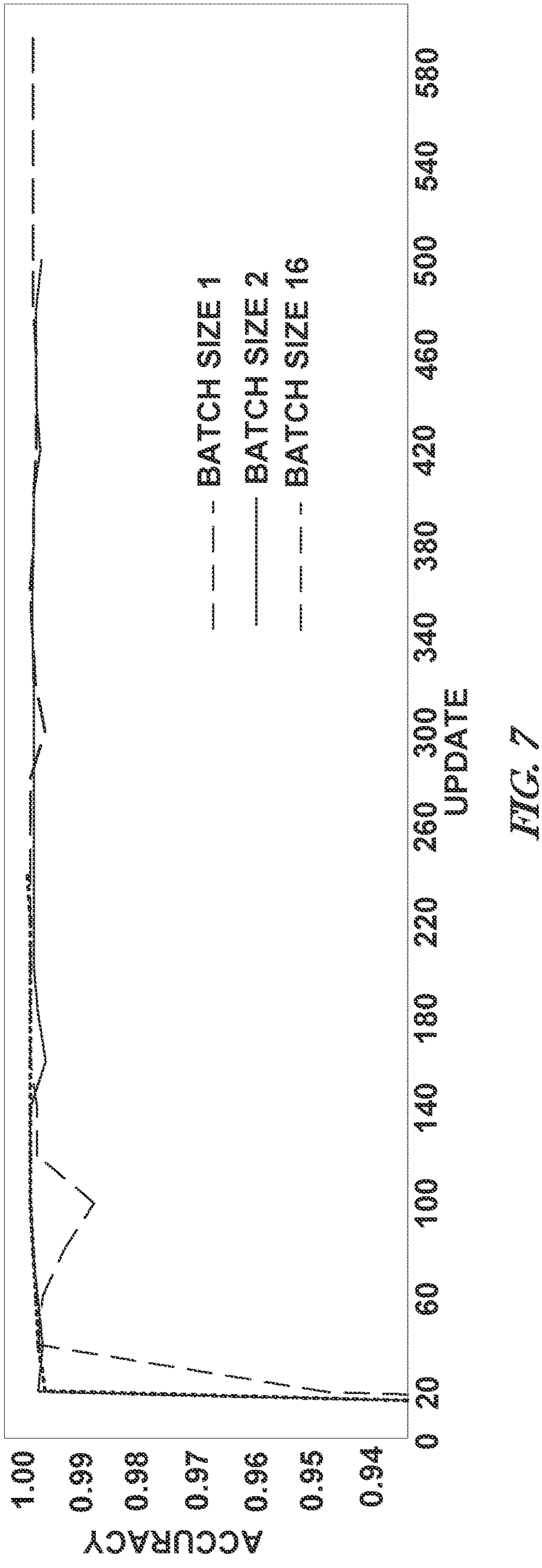
FIG. 7 shows a plot of the network accuracy with increasing batch update for respective batch sizes of 1, 2, and 16.

FIG. 7 shows a plot of the network accuracy with increasing batch update for a batch size of $N_{MB}$=1, $N_{MB}$=2, and $N_{MB}$=16. It is clear from this plot that a batch-size of 16 achieves and maintains the highest accuracy. Meanwhile, a batch-size of 1 tends to experience dips in the accuracy. From this study, it is clear that using a mini-batch worth of data, per parameter update, increases both the training speed and robustness of the approach.

AI is a field concerned with developing decision-making systems to perform cognitive tasks that have traditionally required a living actor, such as a person. NNs are computational structures that are loosely modeled on biological neurons. Generally, NNs encode information (e.g., data or decision making) via weighted connections (e.g., synapses) between nodes (e.g., neurons). Modern NNs are foundational to many AI applications, such as speech recognition.

Many NNs are represented as matrices of weights that correspond to the modeled connections. NNs operate by accepting data into a set of input neurons that often have many outgoing connections to other neurons. At each traversal between neurons, the corresponding weight modifies the input and is passed to an activation function. The result of the activation function is then transmitted to another neuron further down the NN graph. The process of weighting and processing, via activation functions, continues until an output neuron is reached; the pattern and values of the output neurons constituting the result of the ANN processing.

The correct operation of most NNs relies on accurate weights. However, NN designers do not generally know which weights will work for a given application. NN designers typically choose a number of neuron layers or specific connections between layers including circular connections. A training process may be used to determine appropriate weights by selecting initial weights. In some examples, the initial weights may be randomly selected. Training data is fed into the NN and results are compared to an objective function that provides an indication of error. The error indication is a measure of how wrong the NN's result is compared to an expected result. This error is then used to correct the weights. Over many iterations, the weights will collectively converge to encode the operational data into the NN. This process may be called an optimization of the objective function (e.g., a cost or loss function), whereby the cost or loss is minimized.

Gradient descent is a common technique for optimizing a given objective (or loss) function. The gradient (e.g., a vector of partial derivatives) of a scalar field gives the direction of steepest increase of this objective function. Therefore, adjusting the parameters in the opposite direction by a small amount decreases the objective function, in general. After performing a sufficient number of iterations, the parameters will tend towards a minimum value. In some implementations, the learning rate (e.g., step size) is fixed for all iterations. However, small step sizes tend to take a long time to converge, whereas large step sizes may oscillate around a minimum value or exhibit other undesirable behavior. Variable step sizes are usually introduced to provide faster convergence without the downsides of large step sizes.

After a forward pass of input data through the neural network, backpropagation provides an economical approach to evaluate the gradient of the objective function with respect to the network parameters. The final output of the network is built from compositions of operations from each layer, which necessitates the chain rule to calculate the gradient of the objective function. Backpropagation exploits the recursive relationship between the derivative of the objective with respect to a layer output and the corresponding quantity from the layer in front of it, starting from the final layer backwards towards the input layer. This recursive relationship eliminates the redundancy of evaluating the entire chain rule for the derivative of the objective with respect to each parameter. Any well-known optimization algorithm for backpropagation may be used, such as stochastic gradient descent (SGD), Adam, etc.

Figure 8:
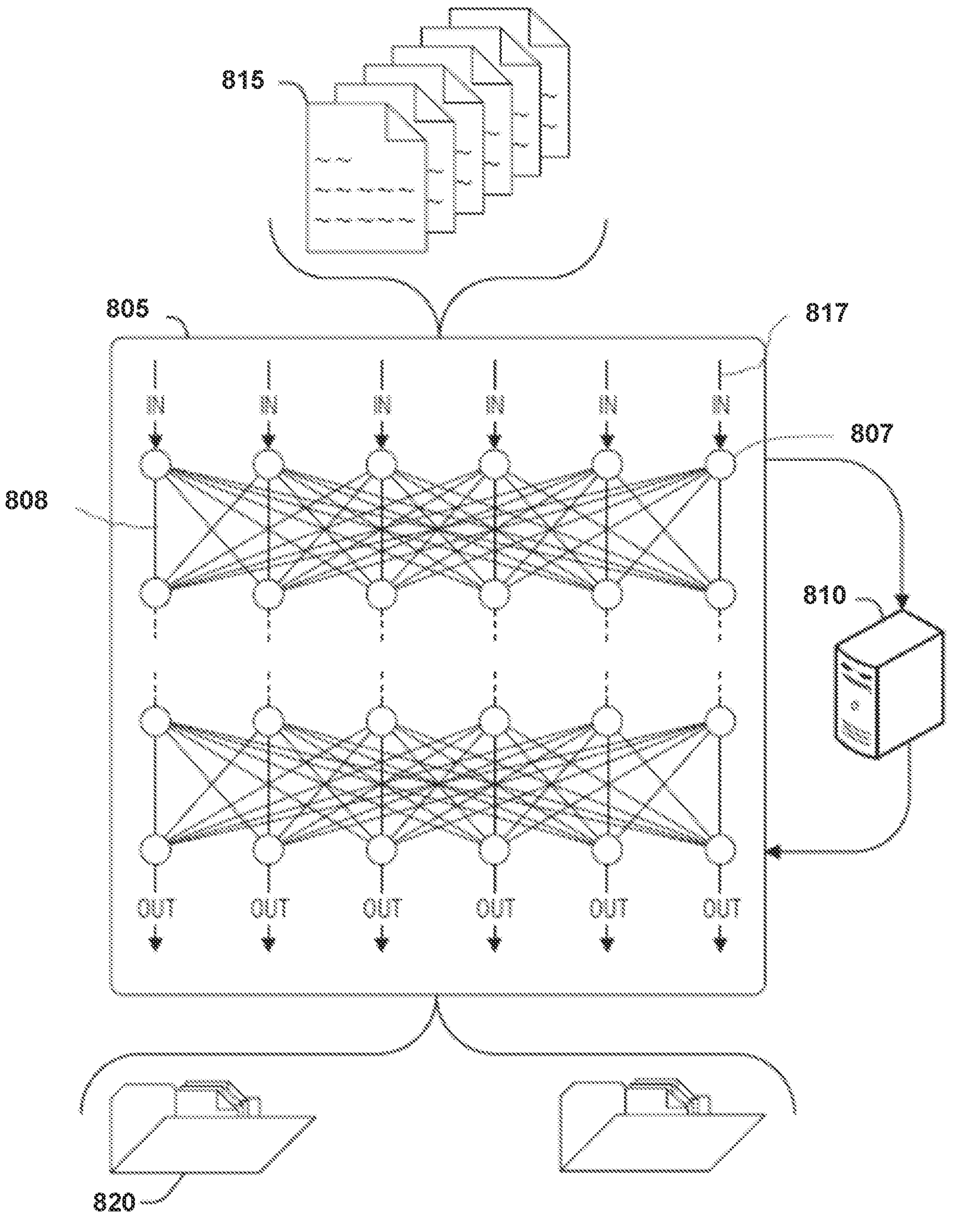
FIG. 8 is a block diagram of an example of an environment including a system for NN training, according to an embodiment.

FIG. 8 is a block diagram of an example of an environment including a system for NN training, according to an embodiment. The system can aid in training of a cyber security solution according to one or more embodiments. The system includes an artificial NN (ANN) 805 that is trained using a processing node 810. The processing node 810 may be a central processing unit (CPU), graphics processing unit (GPU), field programmable gate array (FPGA), digital signal processor (DSP), application specific integrated circuit (ASIC), or other processing circuitry. In an example, multiple processing nodes may be employed to train different layers of the ANN 805, or even different nodes 807 within layers. Thus, a set of processing nodes 810 is arranged to perform the training of the ANN 805.

The set of processing nodes 810 is arranged to receive a training set 815 for the ANN 805. The ANN 805 comprises a set of nodes 807 arranged in layers (illustrated as rows of nodes 807) and a set of inter-node weights 808 (e.g., parameters) between nodes in the set of nodes. In an example, the training set 815 is a subset of a complete training set. Here, the subset may enable processing nodes with limited storage resources to participate in training the ANN 805.

The training data may include multiple numerical values representative of a domain, such as a word, symbol, other part of speech, or the like. Each value of the training or input 817 to be classified once ANN 805 is trained, is provided to a corresponding node 807 in the first layer or input layer of ANN 805. The values propagate through the layers and are changed by the objective function.

As noted above, the set of processing nodes is arranged to train the neural network to create a trained neural network. Once trained, data input into the ANN will produce valid classifications 820 (e.g., the input data 817 will be assigned into categories), for example. The training performed by the set of processing nodes 807 is iterative. In an example, each iteration of the training the neural network is performed independently between layers of the ANN 805. Thus, two distinct layers may be processed in parallel by different members of the set of processing nodes. In an example, different layers of the ANN 805 are trained on different hardware. The members of different members of the set of processing nodes may be located in different packages, housings, computers, cloud-based resources, etc. In an example, each iteration of the training is performed independently between nodes in the set of nodes. This example is an additional parallelization whereby individual nodes 407 (e.g., neurons) are trained independently. In an example, the nodes are trained on different hardware.

Figure 9:
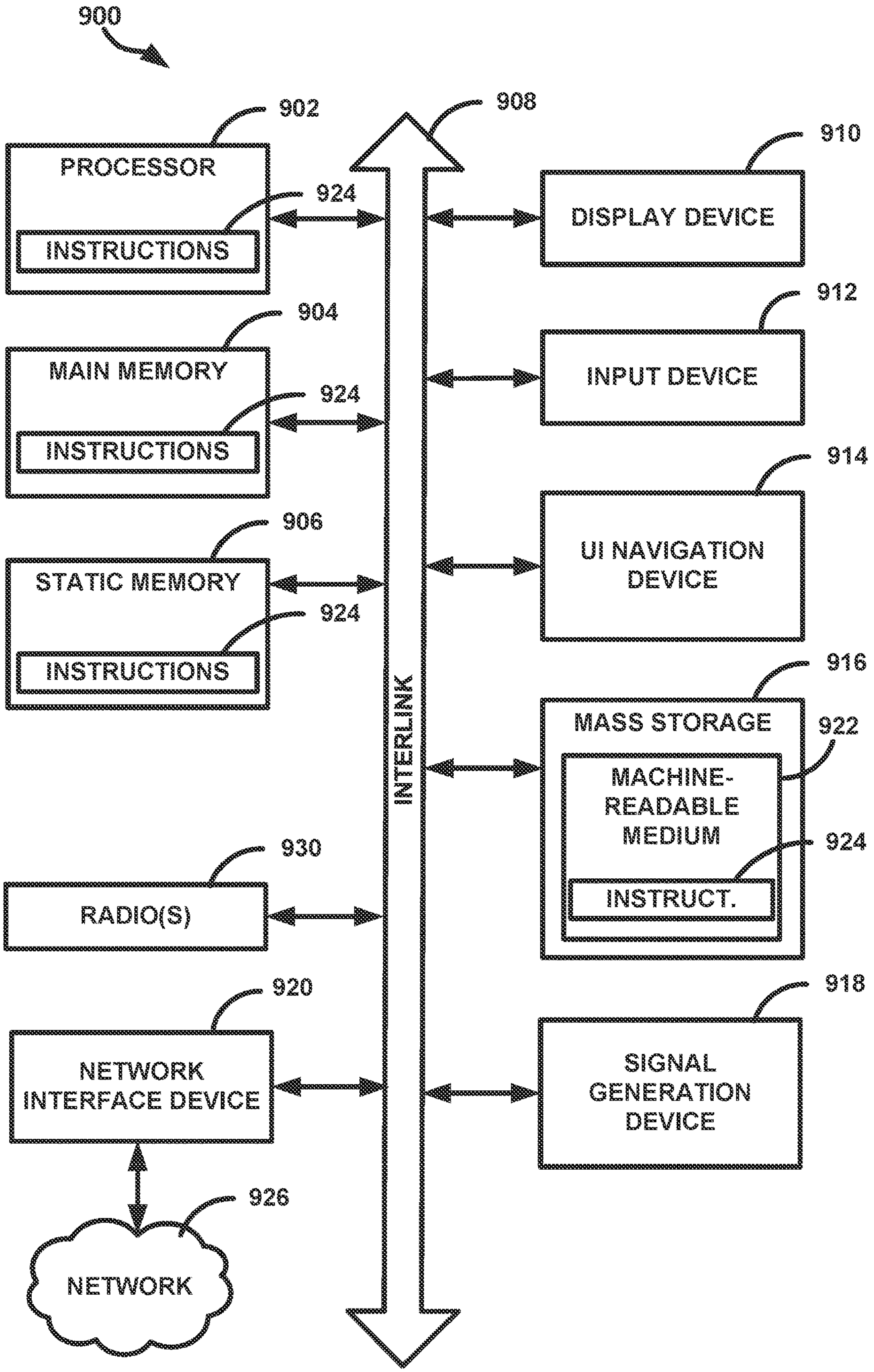
FIG. 9 illustrates, by way of example, a block diagram of an embodiment of a machine in the example form of a computer system within which instructions, for causing the machine to perform any one or more of the methodologies discussed herein, may be executed.

FIG. 9 illustrates, by way of example, a block diagram of an embodiment of a machine in the example form of a computer system 900 within which instructions, for causing the machine to perform any one or more of the methodologies discussed herein, may be executed. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation device 914 (e.g., a mouse), a mass storage unit 916, a signal generation device 918 (e.g., a speaker), a network interface device 920, and a radio 930 such as Bluetooth, WWAN, WLAN, and NFC, permitting the application of security controls on such protocols.

The mass storage unit 916 includes a machine-readable medium 922 on which is stored one or more sets of instructions and data structures (e.g., software) 924 embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding, or carrying instructions for execution by the machine and that cause the machine to perform any one or more of the methodologies of the present invention, or that is capable of storing, encoding, or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding, or carrying instructions for execution by the machine, and includes digital or analog communications signals or other intangible media to facilitate communication of such software.

ADDITIONAL NOTES AND EXAMPLES

Example 1 includes a method for training a Bayesian neural network (BNN) using batched inputs and operating the trained BNN, the method comprising initializing particles such that each particle individually represents pointwise values of respective NN parameters of NNs and that collectively represent a distribution of parameters of the BNN, optimizing, using min-batch training particle flow, the particles based on batches of inputs, resulting in optimized distributions for the parameters, determining a prediction distribution using the optimized distributions for the parameters and predictions from each of the NNs, and providing a marginalized distribution representative of the prediction distribution.

In Example 2, Example 1 can further include, wherein mini-batch training particle flow includes iteratively evolving values of the network parameters based on a log-homotopy.

In Example 3, Example 2 can further include, wherein the mini-batch training particle flow includes evolving the average of a log of the joint posterior probability.

In Example 4, at least one of Examples 2-3 can further include, wherein the mini-batch training particle flow includes determining, for each batch within the training set, a geometric mean of posterior probabilities for each input within the batch.

In Example 5, at least one of Examples 3-4 can further include, wherein evolving the average includes averaging, for each batch within the training set, a Hessian matrix for each input within the batches.

In Example 6, Example 5 can further include, wherein averaging the Hessian matrix includes storing, for each input within the batch, a corresponding Hessian matrix term and a Jacobian term.

In Example 7, Example 6 can further include, wherein averaging the Hessian matrix includes determining, for each input within the batch, a product of the Hessian matrix term and the Jacobian term in the Gauss-Newton approximation resulting in product results, and averaging the product results resulting in an average of the Hessian matrix.

Example 8 includes a system including processing circuitry and memory coupled to the processing circuitry, the memory including instructions that, when executed by the processing circuitry, cause the processing circuitry to perform the method of one of Examples 1-7.

Example 9 includes a non-transitory machine-readable medium including instructions stored thereon that, when executed by a machine, cause the machine to perform the method of one of Examples 1-8.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method for training a Bayesian neural network (BNN) using batched inputs and operating the trained BNN, the method comprising:

initializing particles such that each particle individually represents pointwise values of respective sets of NN parameters of respective NNs and such that the particles collectively represent a distribution of parameters of the BNN;

optimizing, using mini-batch training particle flow, the particles based on batches of inputs, resulting in optimized distributions for the parameters including, for each mini-batch, looping through values of a log-homotopy parameter to evolve a log of a joint posterior probability of the mini-batch including evolving an average of the log of the joint posterior probability over the mini-batch, the average corresponds to a geometric mean of posterior probabilities for each input within the mini-batch, by:

passing a mini-batch of input data through the BNN resulting in a mini-batch of predictions;

determining, based on the mini-batch predictions, mean gradients and Hessians of mini-batch log-likelihood with respect to respective values of the NN parameters, the mean gradients are determined by summing gradients of the log-likelihood for each input within the mini-batch with respect to the NN parameters and the Hessians are determined by averaging Hessian matrices of the log-likelihood for each input within the mini-batch with respect to the NN parameters;

determining drift and diffusion matrices based on the mean gradients and Hessians, the drift matrix is determined as a function of an inverse of a sum of a scaled averaged Hessian of the mini-batch log-likelihood and a Hessian of a log prior, multiplied by the mean gradient of the mini-batch log-likelihood, and wherein the diffusion matrix is determined as a function of the averaged Hessian of the mini-batch log-likelihood and the Hessian of the log prior; and updating respective states of the particles based on the drift and diffusion matrices;

determining a prediction distribution using the optimized distributions for the parameters and predictions from each of the NNs; and providing a marginalized distribution representative of the prediction distribution.

2. The method of claim 1, wherein averaging the Hessian matrix includes storing, for each input within the batch, a corresponding Hessian matrix term and a Jacobian term.

3. The method of claim 2, wherein averaging the Hessian matrix includes:

determining, for each input within the batch, a product of the Hessian matrix term and the Jacobian term in a Gauss-Newton approximation resulting in product results; and averaging the product results resulting in an average of the Hessian matrix.

4. A non-transitory machine-readable medium including instructions that, when executed by a machine, cause the machine to perform operations comprising:

initializing particles such that each particle individually represents pointwise values of respective NN parameters of NNs and such that the particles collectively represent a distribution of parameters of a BNN;

optimizing, using mini-batch training particle flow, the particles based on batches of inputs, resulting in optimized distributions for the parameters including, for each mini-batch, looping through values of a log-homotopy parameter to evolve a log of a joint posterior probability of the mini-batch including evolving an average of the log of the joint posterior probability over the mini-batch, the average corresponds to a geometric mean of posterior probabilities for each input within the mini-batch, by:

passing a mini-batch of input data through the BNN resulting in a mini-batch of predictions;

determining, based on the mini-batch predictions, mean gradients and Hessians of mini-batch log-likelihood with respect to respective values of the NN parameters, the mean gradients are determined by summing gradients of the log-likelihood for each input within the mini-batch with respect to the NN parameters and the Hessians are determined by averaging Hessian matrices of the log-likelihood for each input within the mini-batch with respect to the NN parameters;

determining drift and diffusion matrices based on the mean gradients and Hessians, the drift matrix is determined as a function of an inverse of a sum of a scaled averaged Hessian of the mini-batch log-likelihood and a Hessian of a log prior, multiplied by the mean gradient of the mini-batch log-likelihood, and wherein the diffusion matrix is determined as a function of the averaged Hessian of the mini-batch log-likelihood and the Hessian of the log prior; and updating respective states of the particles based on the drift and diffusion matrices;

determining a prediction distribution using the optimized distributions for the parameters and predictions from each of the NNs; and providing a marginalized distribution representative of the prediction distribution.

5. The non-transitory machine-readable medium of claim 4, wherein averaging the Hessian matrix includes storing, for each input within the batch, a corresponding Hessian matrix term and a Jacobian term.

6. The non-transitory machine-readable medium of claim 5, wherein averaging the Hessian matrix includes:

determining, for each input within the batch, a product of the Hessian matrix term and the Jacobian term in a Gauss-Newton approximation resulting in product results; and averaging the product results resulting in an average of the Hessian matrix.

7. A system comprising:

processing circuitry; and a memory coupled to the processing circuitry, the memory including instructions that, when executed by the processing circuitry, cause the processing circuitry to perform operations comprising:

initializing particles such that each particle individually represents pointwise values of respective NN parameters of NNs and such that the particles collectively represent a distribution of parameters of a BNN;

optimizing, using mini-batch training particle flow, the particles based on batches of inputs, resulting in optimized distributions for the parameters including, for each mini-batch, looping through values of a log-homotopy parameter to evolve a log of a joint posterior probability of the mini-batch including evolving an average of the log of the joint posterior probability over the mini-batch, the average corresponds to a geometric mean of posterior probabilities for each input within the mini-batch, by:

passing a mini-batch of input data through the BNN resulting in a mini-batch of predictions;

determining, based on the mini-batch predictions, mean gradients and Hessians of mini-batch log-likelihood with respect to respective values of the NN parameters, the mean gradients are determined by summing gradients of the log-likelihood for each input within the mini-batch with respect to the NN parameters and the Hessians are determined by averaging Hessian matrices of the log-likelihood for each input within the mini-batch with respect to the NN parameters;

determining drift and diffusion matrices based on the mean gradients and Hessians, the drift matrix is determined as a function of an inverse of a sum of a scaled averaged Hessian of the mini-batch log-likelihood and a Hessian of a log prior, multiplied by the mean gradient of the mini-batch log-likelihood, and wherein the diffusion matrix is determined as a function of the averaged Hessian of the mini-batch log-likelihood and the Hessian of the log prior; and updating respective states of the particles based on the drift and diffusion matrices;

determining a prediction distribution using the optimized distributions for the parameters and predictions from each of the NNs; and providing a marginalized distribution representative of the prediction distribution.

8. The system of claim 7, wherein averaging the Hessian matrix includes:

storing, for each input within the batch, a corresponding Hessian matrix term and a Jacobian term;

determining, for each input within the batch, a product of the Hessian matrix term and the Jacobian term in a Gauss-Newton approximation resulting in product results; and averaging the product results resulting in an average of the Hessian matrix.

* * * * *